June 28, 1955   J. H. KONEFES   2,711,839
BOTTLE HANDLE ASSEMBLY
Filed March 12, 1951   2 Sheets-Sheet 1

INVENTOR.
JOSEPH H. KONEFES
BY
ATTORNEYS

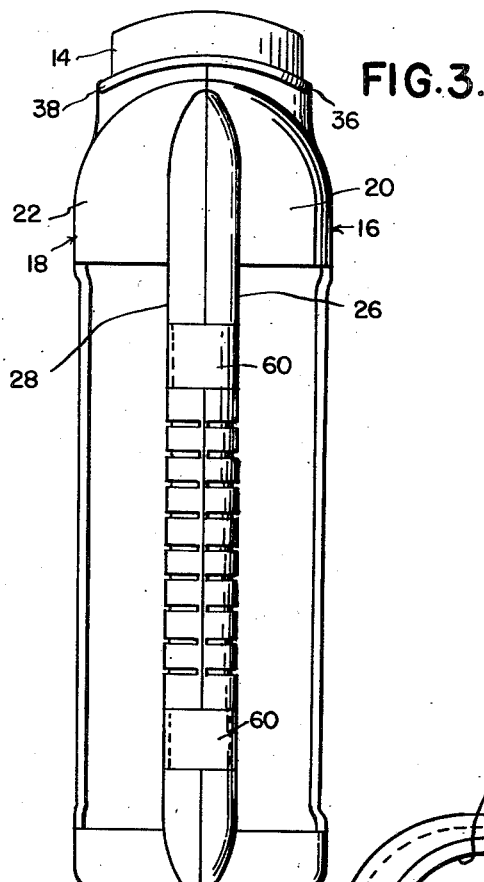
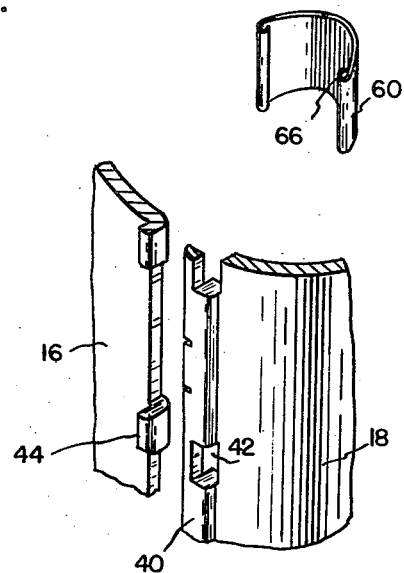
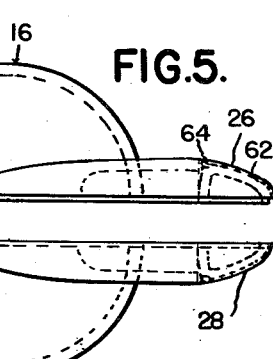
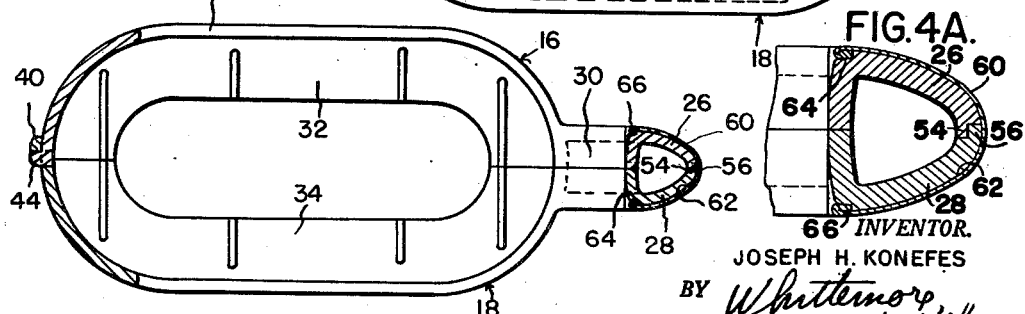

United States Patent Office 2,711,839
Patented June 28, 1955

2,711,839

BOTTLE HANDLE ASSEMBLY

Joseph H. Konefes, Libertyville, Ill., assignor to Motor Products Corporation, Detroit, Mich., a corporation of New York Application March 12, 1951, Serial No. 215,117

5 Claims. (Cl. 215—12)

The present invention relates to a bottle handle assembly and more particularly, to a bottle handle assembly designed to cooperate with a water bottle of the type commonly used in home refrigerators.

It is an object of the present invention to provide a bottle handle assembly which is attractive in appearance and which facilitates the use of the water bottle.

It is a further object of the present invention to provide a bottle handle assembly designed to be applied to the bottle and removed therefrom.

It is a further object of the present invention to provide a handle assembly for bottles comprising two shell members having body portions adapted to surround the water bottle and cooperating handle portions adapted to abut in the assembly to form a composite handle.

It is a further object of the present invention to provide a bottle handle assembly formed of two main parts shaped to envelop the water bottle comprising interlocking means at adjacent edges of the members and a releasable clip at the opposite edges of said members to retain the parts in assembly.

Other objects and features of the invention will become apparent as the description proceeds, especially when taken in conjunction with the accompanying drawings, wherein:

Figure 3 is a rear elevation of the assembly.

Figure 4 is a section on the line 4—4, Figure 1.

Figure 4A is a fragmentary enlargement of a sectional view through the handle.

Figure 5 is a top plan view of the handle members separated to show their cooperative relationship.

Figure 6 is a fragmentary perspective view illustrating the interlocking means at adjacent edges of the shell members.

Figure 7 is a perspective view of the resilient clip used in assembling the parts together.

Figures 1, 2:
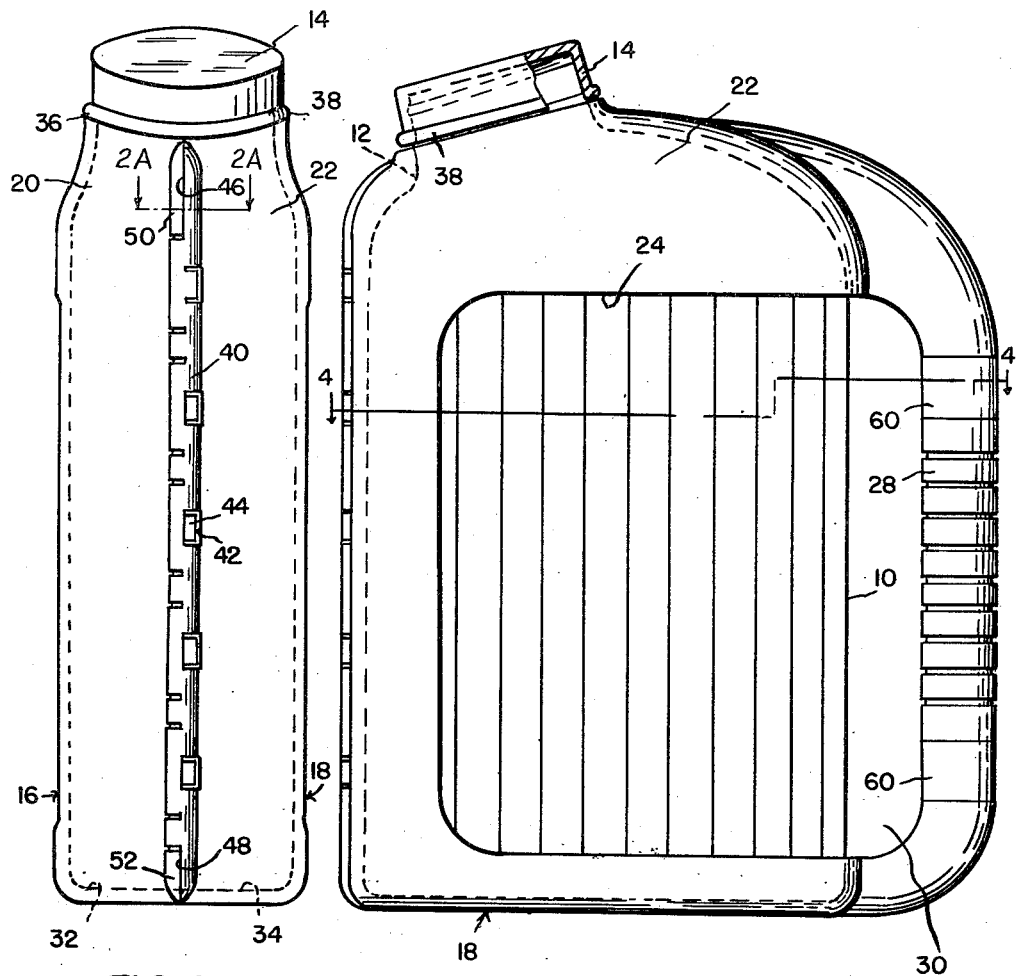
Figure 1 is a side elevation of the handle assembly applied to a water bottle, with parts in section.
Figure 2 is a front elevation of the assembly.

Referring now to the figures the invention is illustrated as applied to a water bottle 10 which is flat in conformation and which has an inclined neck 12 adjacent an upper corner of the bottle to facilitate pouring. The water bottle has associated therewith the usual removable screw cap 14.

In order to provide a handle to facilitate pouring from the bottle a pair of shell members 16 and 18 are provided. The shell members 16 and 18 are generally similar in configuration and include body portions 20 and 22 respectively. The body portions are of concave configuration shaped to embrace approximately half of the bottle. Thus, in assembly the two shell members 16 and 18 together completely embrace the bottle. Preferably, the shell members include relatively large openings 24 through which the bottle is exposed so that the quantity of liquid in the bottle is visible.

The shell members 16 and 18 each include a handle portion 26 and 28 respectively. It will be noted that the openings 24 in the shell members extend at one side to the handle portions 26 and 28, so that the handle provides a handle opening 30 limited on one side by an exposed edge of the bottle 10.

The shell members 16 and 18 include bottom portions 32 and 34 respectively, which underlie portions of the bottle 10 and support it. The shell members are shaped to fit closely around the upper portions of the bottle and are provided with generally semi-circular collar portions 36 and 38 at the top, adapted to surround the neck 12 of the bottle.

Figure 2A:
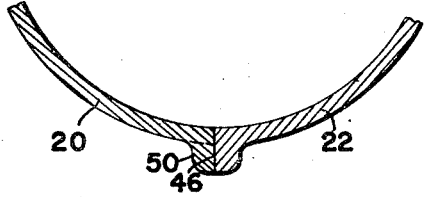
Figure 2A is a fragmentary section on the line 2A—2A, Figure 2.

In order to provide for quick assembly and disassembly of the handle with respect to the bottle, the edges of the shell members 16 and 18 are shaped to interfit. As best seen in Figure 6, the shell member 18 is provided with an offset flange 40 having a plurality of openings 42 therein. The flange 40 is adapted to overlie the adjacent edge of the shell member 16. The shell member 16 is provided with a plurality of outwardly extending lugs 44 adapted to be received within the openings 42. At the top and bottom of the flange 40, as best seen in Figures 2 and 2A, the flange is notched out as indicated at 46 and 48. The shell member 16 is provided with elongated lugs or projections 50 and 52 adapted to enter the notches 46 and 48 respectively.

From the foregoing description it will be observed that the openings 42 and lugs 44 interlock to prevent separation between shell members 16 and 18 except in a direction which would withdraw the lugs from the openings. In order to prevent accidental disassembly of the parts, the handle portions 26 and 28 are given the configuration best illustrated in Figures 4 and 4A. Here it will be observed that the handle portion 26 is provided with an abutment 54 adapted to engage a corresponding abutment 56 on the handle portion 28. Abutments 54 and 56 when engaged prevent relative motion between shell members 16 and 18 in the direction which would permit withdrawal of the lugs 44 from the openings 42.

In order to retain the parts in the assembled position a plurality of resilient spring clips 60 are provided. As best seen in Figure 1, the spring clips 60 are located adjacent the top and bottom of the handle. In order to most efficiently cooperate with the spring clips 60 the handle portions 26 and 28 are each provided with shallow grooves 62, each of which terminates at the end adjacent the bottle in a recess 64. The grooves 62 are of a depth substantially equal to the thickness of the clip 60. The clip 60 as best seen in Figure 7, is provided with abutments 66 at its ends, these abutments conveniently being formed by rolling the metal of the spring clip as illustrated in the figure. The abutments 66 are of a shape to be received within the recesses 64. Accordingly, when the spring clip 60 is pressed onto the assembled handle, as best seen in Figure 4, the abutments 66 snap into the recesses 64 and retain the handle parts in assembled relation. At this time the shell members 16 and 18 are retained in assembled position by the cooperative action of the lugs 44 with the recesses 42, the abutments 54 and 56, and the action of the spring clip 60, in retaining the handle portions 26 and 28 in abutment.

It will of course be obvious that the handle may be readily detached from the bottle by the simple expedient of releasing the spring clip 60. Thereafter the handle portions 26 and 28 may be separated by an amount sufficient to separate the abutments 54 and 56, after which the shell member 16 may be moved to the right as seen in Figure 4 to separate the parts.

Preferably the shell members are formed of plastic material, such as polystyrene, and due to the thin wall section and hollow, open design of the handle, the shell members may be of light weight and are economical in the amount of material required.

The drawings and the foregoing specification constitute a description of the improved bottle handle assembly in such full, clear, concise and exact terms as to enable any person skilled in the art to practice the invention, the scope of which is indicated by the appended claims.

What I claim as my invention is:

1. A detachable handle assembly for a bottle comprising a pair of members each having a concave body portion shaped to fit around one-half of a bottle and having recesses to fit around to expose the neck of the bottle for pouring and having matching handle portions extending rearwardly from said body portion, interfitting means at the front edges of said body portions including abutting surfaces preventing separation between the front edges of said members except as a result of rearward movement of one of said members relative to the other, the handle portions of said one member having a rearwardly facing abutment surface, the handle portions of said other member having a forwardly facing abutment surface engaging said rearwardly facing abutment surface when said handle portions are moved laterally into engagement to enclose the body portions of said members around a bottle after matching the interfitting means at the front edges of said body portions, and a clip fitted over said handle portions to prevent lateral separation therebetween and hence to prevent rearward movement of said one member relative to the other.

2. A detachable handle assembly for a bottle comprising a pair of members each having a concave body portion shaped to fit around one-half of a bottle and having recesses to fit around to expose the neck of the bottle for pouring and having matching handle portions extending rearwardly from said body portion, interfitting means at the front edges of said body portions comprising a plurality of forwardly extending lugs at the forward edge of one of said members, a bead at the forward edge of said other member having lug-receiving portions, said lugs cooperating with said lug-receiving portions to prevent separation between the interfitted front edge portions except by rearward movement of said one member relative to the other, the handle portions of said one member having a rearwardly facing abutment surface, the handle portions of said other member having a forwardly facing abutment surface engaging said rearwardly facing abutment surface when said handle portions are moved laterally into engagement to enclose the body portions of said members around a bottle after matching the interfitting means at the front edges of said body portions, and a clip fitted over said handle portions to prevent lateral separation therebetween and hence to prevent rearward movement of said one member relative to the other.

3. A detachable handle assembly for a bottle comprising a pair of members each having a concave body portion shaped to fit around one-half of a bottle and having recesses to fit around to expose the neck of the bottle for pouring and having matching handle portions extending rearwardly from said body portion and connected at the top and bottom thereto, interfitting means at the front edges of said body portions comprising a plurality of forwardly extending lugs at the forward edge of one of said members, a bead at the forward edge of said other member having lug-receiving portions, said lugs cooperating with said lug-receiving portions to prevent separation between the interfitted front edge portions except by rearward movement of said one member relative to the other, the handle portions of said one member having a rearwardly facing abutment surface, the handle portions of said other member having a forwardly facing abutment surface engaging said rearwardly facing abutment surface when said handle portions are moved laterally into engagement to enclose the body portions of said members around a bottle after matching the interfitting means at the front edges of said body portions, and a resilient U-shaped clip fitted over said handle portions to prevent lateral separation therebetween and hence to prevent rearward movement of said one member relative to the other, and a removable spring clip holding said handle portions together in matched relation.

4. A detachable handle assembly for vertically elongated bottles comprising a pair of members each having a concave body portion shaped to fit around a lateral half of a bottle, and including a bottom portion adapted to underlie the bottle and a top portion adapted to overlie the bottle and having a recess to fit around the neck of the bottle to expose the neck for pouring, one of said body portions having a plurality of forwardly extending lugs at the front edge of its body portion, the other of said members having a forwardly offset bead at its front edge, said bead having openings therethrough, said bead being adapted to cover the front edge of said one member when the lugs thereof are received in said openings to prevent relative movement between said members except rearward movement of said one member, said members each including matching handle portions connected thereto adjacent the top and bottom thereof and extending rearwardly therefrom, transversely extending abutment surfaces on said members spaced rearwardly from the front edges thereof and adapted to abut and thus to prevent rearward movement of said one member from interfitted position with said other member while the handle portions of said members are in lateral engagement and a U-shaped spring clip adapted to fit over said handle portions to prevent lateral separation thereof, and thus to retain said abutment surfaces in abutment and to prevent withdrawal of said lugs from the lug-receiving openings in said bead.

5. In combination, a flat bottle having a pouring neck at the top and adjacent the front edge thereof, a detachable handle assembly supporting the bottle for pouring comprising a pair of laterally separable members each having a concave body portion shaped to fit around one-half of the bottle from approximately the middle portion of one edge to the middle portion of the other edge thereof, said members including portions underlying and supporting the bottle and other portions overlying and retaining the bottle in the assembly, said body portions including lateral recesses in their top edges adjacent the front edges thereof receiving and surrounding the neck of said bottle and exposing the same for pouring, interfitting means at the front edges of said body portions including abutting surfaces preventing separation between the front edges of said members except as a result of rearward movement of one of said members relative to the other, each of said body portions having at its rear edge a rearwardly extending handle portion connected thereto adjacent the top and bottom thereof, the handle portion of said one member having a rearwardly facing abutment surface, the handle portion of said other member having a forwardly facing abutment surface engaging said rearwardly facing abutment surface when said handle portions are moved laterally into engagement to enclose the body portions of said members around the bottle, and a spring clip fitted over said handle portions to prevent lateral separation therebetween and hence to prevent rearward movement of said one member relative to the other and to prevent separation between the interfitting means at the front edges of said body portions.

References Cited in the file of this patent

UNITED STATES PATENTS

| Number | Name | Date |
|---|---|---|
| 120,769 | Nobles | Nov. 7, 1871 |
| 188,245 | Horsford | Mar. 13, 1877 |
| 310,365 | Bock | Jan. 6, 1885 |
| 641,273 | Coon | Jan. 16, 1900 |
| 770,528 | Kestner | Sept. 20, 1904 |
| 2,049,219 | Muschinske | July 28, 1936 |
| 2,328,338 | Hauptman | Aug. 31, 1943 |
| 2,424,045 | Millstein | July 15, 1947 |
| 2,447,429 | Procter | Aug. 17, 1948 |
| 2,490,541 | Procter | Dec. 6, 1949 |